United States Patent [19]

Stalego

[11] 3,881,903
[45] May 6, 1975

[54] APPARATUS FOR PRODUCING GLASS FIBERS

[75] Inventor: Charles J. Stalego, Newark, Ohio

[73] Assignee: Owens-Corning Fiberglas Corporation, Toledo, Ohio

[22] Filed: Apr. 4, 1974

[21] Appl. No.: 457,883

[52] U.S. Cl. .................. 65/16; 264/168; 425/76
[51] Int. Cl. ............................................ C03b 37/06
[58] Field of Search ............ 65/16, 9; 425/7, 66, 76; 264/168

[56] References Cited
UNITED STATES PATENTS

| | | | |
|---|---|---|---|
| 1,627,982 | 5/1927 | Maguet | 65/16 X |
| 2,578,101 | 12/1951 | Stalego | 65/16 |
| 2,927,621 | 3/1960 | Slayter et al | 65/9 |
| 2,961,698 | 11/1960 | Rea | 65/16 X |
| 2,982,991 | 5/1961 | Karlovitz | 65/16 X |

*Primary Examiner*—Robert L. Lindsay, Jr.
*Attorney, Agent, or Firm*—Carl G. Staelin; John W. Overman; Oliver E. Todd

[57] ABSTRACT

Apparatus for producing curly and straight fibers from a molten fiber forming material such as glass. A high velocity gaseous jet attenuates streams of the molten material into fibers. Before the fibers have completely hardened, a random curl may be imparted to the fibers as they pass through an elongated expansion nozzle, imparting turbulence to the gas stream. The degree of curl may be varied by parameter adjustments to the expansion nozzle. A pneumatic flip-flop may be incorporated into the gas expansion means for distributing the curled fibers on a collection surface.

11 Claims, 11 Drawing Figures

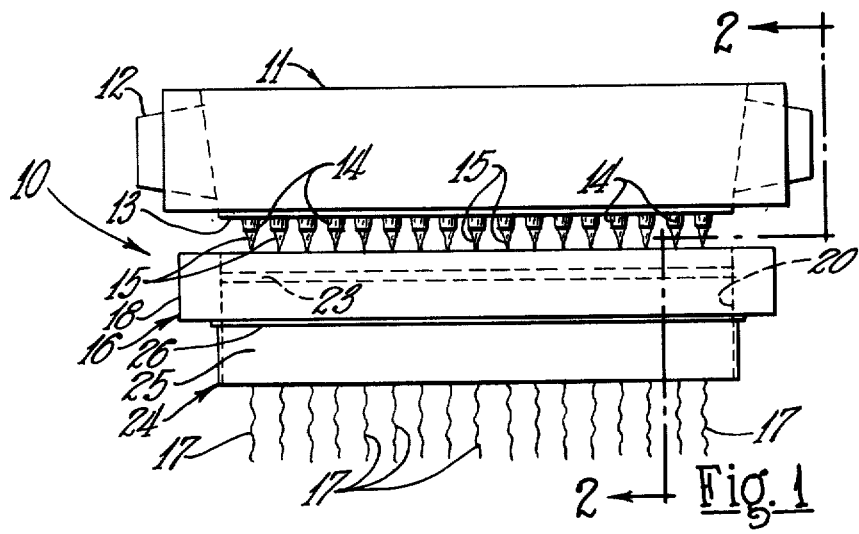
Fig. 1
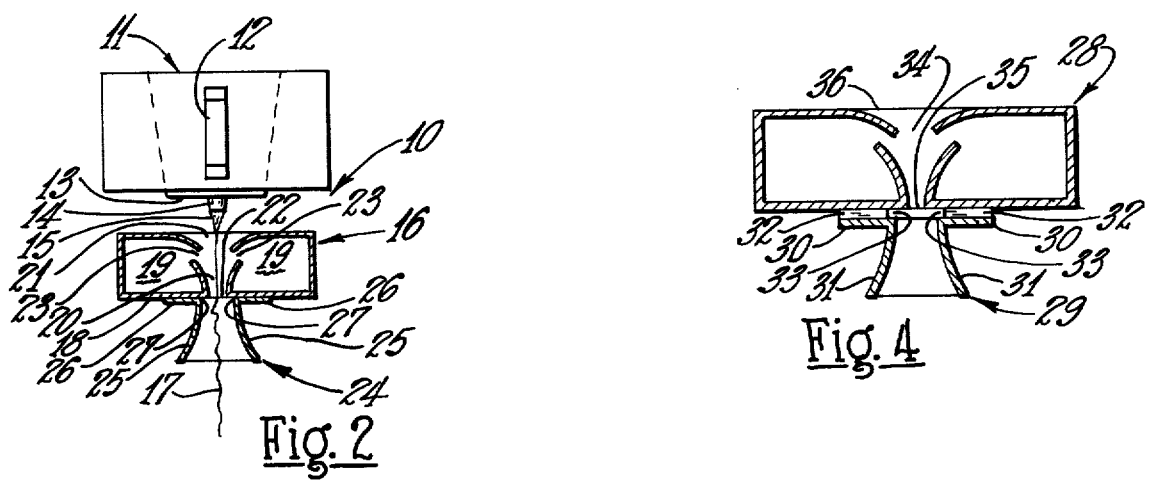
Fig. 2
Fig. 4
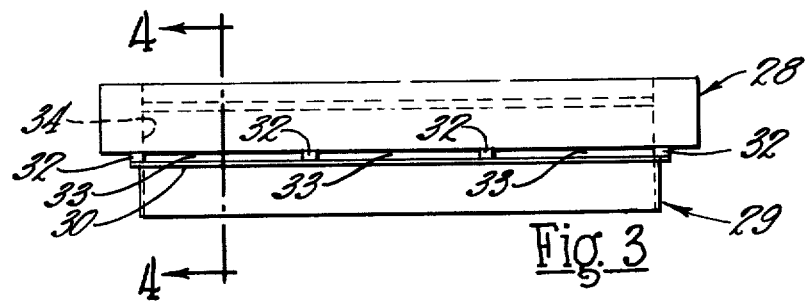
Fig. 3

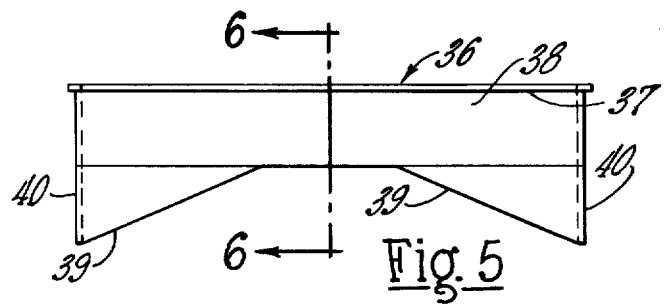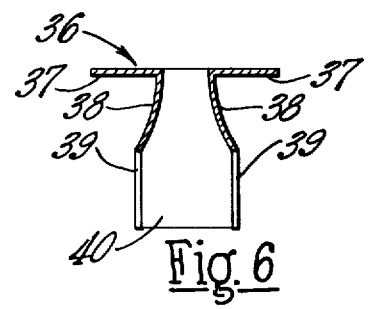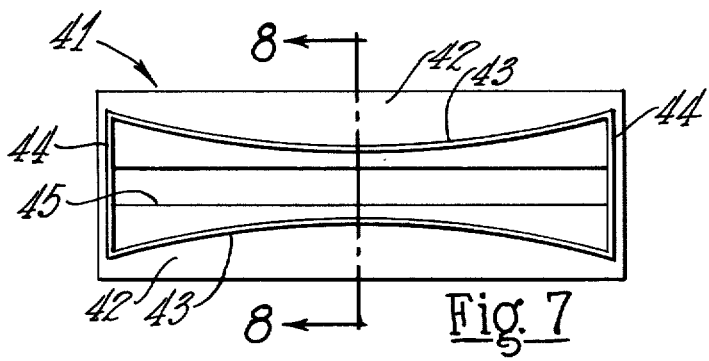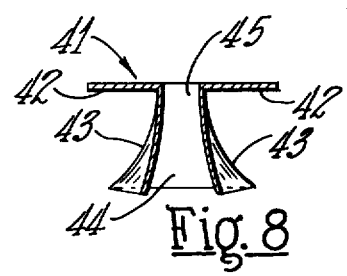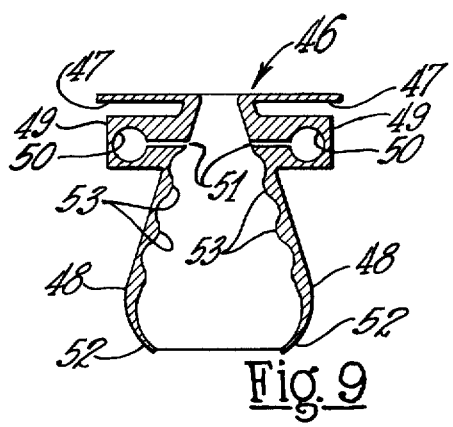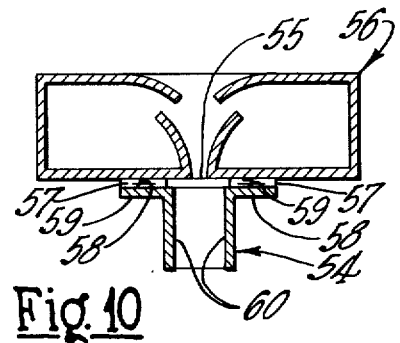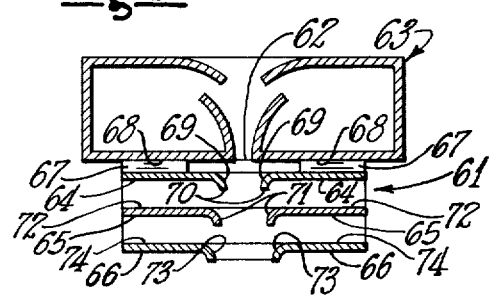

APPARATUS FOR PRODUCING GLASS FIBERS

BACKGROUND OF THE INVENTION

The present invention relates to apparatus for producing fibers from heat-softenable materials and more particularly to the production of fibers by attenuating streams of a molten material such as glass into fibers through the utilization of high velocity gaseous or fluid blasts and imparting the desired amount of random curl to the fibers.

One common method used for producing glass fibers for filters, mats, batts and the like has been by engaging streams of molten glass with high velocity gaseous or fluid blasts to attenuate the flowing streams into fine fibers. In such processes, attenuation of the molten glass streams is attained by directing blasts of a pressurized fluid such as steam or air emitted from nozzles or orifices in a blower at opposite sides of one or more rows of such streams. Fibers attenuated by such processes have been used to form a fibrous mat containing a suitable binder which is cured to hold the fibers in an integrated assembly. Such products are generally known as bonded mats. In the production of fibers for bonded mats, a bushing or feeder means having a plurality of orifices for issuing streams of the molten glass material is positioned above a blower means that supplies the attenuating fluid blasts. The blower housing generally is disposed beneath the feeder, having a rectangular walled vertical slot with inlet and outlet openings for receiving and discharging the flowing glass streams extending therethrough. Orifices are positioned along the walls of the slot causing high velocity jets of fluid to emanate therefrom and into the slot engaging the molten glass streams. The orifice openings are so positioned with respect to the slot as to direct the fluid jets therethrough, causing an augmented flow of ambient air to be drawn in through the slot inlet. The induced air flow entrains the streams of molten glass, assisting the attenuation process.

In many instances, it is desirable to form a glass fiber mat from fibers having a high amount of curl or a combination of fibers having varying amounts of curl. Highly curled glass fibers impart a greater resiliency and integrity to a mat than near straight fibers of the same diameter, while the near straight fibers impart strength to the mat. Mats formed from curly fibers are well suited for use as filtering media. Several methods have been used in the past for imparting a curl to fibers as they are being formed. One prior art method is disclosed in U.S. Pat. No. 3,236,616 in which a baffle or curling surface is positioned below the blower in the path of the fiber attenuating fluid blast and the entrained fibers. The curling surface is so positioned to deflect and thereby impart a curl to the fibers as they harden or set. However, if the curling surface is not accurately positioned, the fibers may either strike the surface when they are too soft and fuse together or strike the surface when they are too hard and breakup excessively. Another prior art method for forming curly fibers is shown in U.S. Pat. No. 2,917,621 in which a pair of ribbed or corrugated skirts are positioned below the blower outlet, defining a serpentine air flow path. After the fibers are attenuated by a high velocity fluid blast, they harden or set within the serpentine region between the skirts. Care must be taken here to prevent the fibers from impinging upon the walls or ribs of the skirts which, if permitted, will cause breakup of the hardened fibers.

SUMMARY OF THE INVENTION

According to the present invention, method and apparatus are provided for the production of glass fibers having various degrees of random curl using a gaseous blast means of attenuation. The gaseous blast engages the molten streams of glass and because of the fluid flow properties of the stream as it passes through the forming nozzle or slot, imparts a desired random curl or wave to the glass fiber while still in the plastic or formable stage. The blower or gaseous blast means is positioned and designed so as to cause a flow of augmented ambient air to be drawn into the inlet of the forming nozzle or slot. Said augmented ambient air assists the curl or wave forming mechanism. Because of the fluid flow complexities, the manner in which the augmented flow of ambient air aids the curl or wave mechanism is not fully understood at this time.

The apparatus includes a conventional bushing or feeder for holding a molten body of fiber forming material. A plurality of orifices are arranged in one or two rows along the bottom of the bushing for issuing a plurality of streams of the molten material. The orifices are aligned with an elongated vertical slot extending through the blower which issues a blast of steam, air or other fluid for attenuating the material streams into fibers. The attenuated fibers are in a soft condition as they pass from the blower and into the forming nozzle or slot comprising a pair of spaced sidewalls forming a rectangular skirt. The skirt sidewalls may curve generally downward and outward or they may be stepped outwardly from the blower outlet, causing a rapid step expansion of the fluid leaving the blower outlet. As the fluid expands, it is believed that the velocity rapidly decreases and that turbulence is induced. Either the decrease in velocity, the induced turbulence, or both, is believed to cause the fibers to take on a random curly shape while within the region between the spaced sidewalls. At this point, the fibers also harden or set, thereby taking on a permanent random curl. Since the fibers do not impinge upon any surface, there is little problem with breakup of the hardened fibers. In a modification of the skirts, the skirts are shaped or otherwise adapted to prevent the fibers from "necking in" or bunching up and possible fusing together before they have completely set and from abrading after they are set. The skirt walls may be shaped, as by increasing the degree of skirt divergence or corrugating the inside walls of the skirt, to promote a higher turbulence in the expanding fluid to increase the random curl imparted to the fibers. A pneumatic flip-flop also may be incorporated within the walls of the skirt for distributing the curled fibers on a collection surface and for increasing turbulence to enhance the curling or waving action. The skirt may also comprise a plurality of fins defining a plurality of air inlets adapted to establish a stratified flow of ambient air on opposite sides of the fluid passing through the skirt. Here the stratified air layers restrain the fluid to prevent expansion and turbulence, thereby resulting in straight fibers. In each embodiment, the skirt is spaced below the blower and ambient air is induced to flow through and along the sidewalls of the skirt.

Accordingly, it is the preferred object of the invention to provide improved apparatus for producing fibers from a heat-softenable fiber forming material such as glass.

Another object of the invention is to provide apparatus for forming randomly curled fibers from a heat-softenable fiber forming material which minimizes breakup of the curled fibers.

Still another object of the invention is to provide improved apparatus for controlling a flow of fiber attenuating fluid and entrained fibers immediately after the fibers are attenuated and until the fibers have set.

Other objects and advantages of the invention will become apparent from the following detailed description, with reference being made to the accompanying drawings.

BRIEF DESCRIPTION OF THE DRAWINGS

FIG. 1 is a side elevational view of apparatus constructed in accordance with a first embodiment of the present invention for forming randomly curled fibers;

FIG. 2 is a vertical cross-sectional end view taken along line 2—2 of FIG. 1;

FIG. 3 is a side elevational view of a modified embodiment of a fiber attenuating blower and attached skirt of curly fiber forming apparatus constructed in accordance with the present invention;

FIG. 4 is a vertical cross-sectional end view taken along line 4—4 of FIG. 3;

FIG. 5 is a side elevational view of a modified embodiment of a skirt for attachment to a fiber attenuating blower in curly fiber forming apparatus constructed in accordance with the present invention;

FIG. 6 is a vertical cross-sectional view taken along line 6—6 of FIG. 5;

FIG. 7 is a bottom view of a modified embodiment of a skirt for attachment to a fiber attenuating blower in curly fiber forming apparatus constructed in accordance with the present invention;

FIG. 8 is a vertical cross-sectional end view taken along line 8—8 of FIG. 7;

FIG. 9 is a vertical cross-sectional end view of a skirt in accordance with still another embodiment of the present invention for use in curly fiber forming apparatus;

FIG. 10 is a vertical cross-sectional view of another embodiment of a skirt attached to a fiber attenuating blower for producing curly and straight fibers; and FIG. 11 is a vertical cross-sectional view of still another embodiment of a skirt attached to a fiber attenuating blower for producing straight fibers.

DESCRIPTION OF THE PREFERRED EMBODIMENTS

Turning now to the drawings and particularly to FIGS. 1 and 2, apparatus 10 is shown according to the present invention for producing curly fibers from glass or similar thermoplastic fiber forming materials. The apparatus 10 includes a bushing or feeder 11 for holding a supply of the molten glass. Glass may be supplied to the bushing 11 in the form of marbles or directly from any glass melting means (not shown). A pair of terminals 12 are formed at opposite ends of the bushing 11 for attachment to an electric power source for applying electric current to melt the glass and to maintain a predetermined temperature in the molten glass by means of the Joule effect.

The bushing 11 has a bottom 13 from which a plurality of tips 14 depend. The tips 14 are closely spaced and are arranged in preferably one and possibly two rows. Each tip 14 defines a small orifice through which a stream 15 of molten glass flows by the force of gravity. A blower 16 is positioned below the bushing 11 for supplying a stream or jet of high velocity fluid which attenuates the molten glass streams 15 into fibers 17. The blower 16 includes an elongated housing 18 defining two identical internal chambers 19. A walled vertical slot 20 extends through the middle of the housing between the chambers 19. The slot 20 is located below the bushing tips 14 and has an inlet 21 through which the molten glass streams 15 flow and an outlet 22 through which the attenuated fibers 17 are blown. Downwardly directed orifices or elongated openings 23 are formed within the sides of the slot 20. During operation of the apparatus 10, a pressurized fluid such as steam or air is supplied to the chambers 19. This pressurized fluid is emitted through the orifices 23 to form high velocity downwardly directed fluid jets. The fluid jets are directed such that they are emitted through the slot outlet 22. At the same time, they induce an augmented ambient air flow from the adjacent environment downwardly through the slot inlet 21 and the slot outlet 22. The fluid jets and the flow of augmented air forms a veil having a velocity sufficient to entrain and accelerate the downwardly flowing streams 15 of molten glass, thereby attenuating the streams 15 into fibers 17.

The attenuated fibers 17 passing from the blower outlet 22 will normally be in a plastic condition. These fibers will harden or take on a permanent set within the region immediately downstream of the blower outlet 22. Typically, the fibers harden within one or two inches of the bushing tips 14, depending upon various factors such as fiber diameter and the fluid velocity and temperature within the blower 16. Normally, the velocity and direction of the fluid flowing from the blower outlet 22 maintains the fibers 17 in a straight condition until they have hardened or taken on a permanent set. According to the present invention, means is provided for controlling the velocity and turbulence of the fluid in the region immediately downstream of the blower outlet 22. When the velocity of the fluid is decreased and made turbulent while the fibers are still soft, the entrained fibers 17 tend to take on a randomly curled or alternately curly and straight configuration. This fluctuating configuration is maintained until the fibers harden.

In practice, the fibers alternate between curly or wavy sections and substantially straight sections. One theory is that this may be caused by an increase in aerodynamic drag when the fibers assume a curled configuration. With the increased drag, the fluid rapidly accelerates the fibers for a short time, resulting in a substantially straight section in the hardened fiber. After the velocity of the fiber increases, the aerodynamic drag is reduced on the straight section and the fibers will again pile up and take on a curl after the straight section. The curl formed in the fibers is very random. The curly sections may range, for example, from a single short bend or up to a four inch or more long kinky section. The curly sections are separated by straight sections which may range, for example, from ¼ inch up to 12 inches or more. The longer straight sections tend to have a gradual curve rather than being perfectly straight. It is not known whether this phenomenon occurs as a consequence of the decrease in velocity of the expanding fluid or of the turbulence set up within the fluid leaving the blower outlet.

The velocity of the fluid leaving the blower outlet 22 is decreased by providing a skirt 24 adjacent the blower outlet 22 for causing the fluid to rapidly expand. The skirt 24 includes a pair of spaced sidewalls 25 terminating at flanges 26 which are connected to the lower side of the blower housing 18. Upper edges 27 of the sidewalls 25 are spaced or stepped slightly outwardly from the blower outlet 22. A slight spacing of the sidewalls 25 facilitates alignment of the skirt 24 with the blower outlet 22 and may also function to increase turbulence in the expanding fluid. From the upper edges 27, the sidewalls 25 curve downwardly and outwardly to form an expansion chamber or region for the high velocity fluid passing from the blower outlet 22. As the fluid expands within the region defined by the skirt 24, its velocity and temperature both decrease. The decrease in fluid velocity is believed to cause the entrained fibers to slow down and pile up since the fibers are believed to move at approximately 90 percent or less of the speed of the fluid because of their small mass. At the same time, the fibers are rapidly cooled by the ambient temperature of the fluid and by the cooling effect of the expanding fluid until they become set in the curled condition caused by the pile up. The fluid turbulence is also believed to help impart a curl to the fibers as they harden. The hardened fibers are then projected from the skirt 24 downwardly onto a conventional collection surface, such as a moving foraminous conveyor (not shown).

The degree of flare to the downwardly and outwardly curving sidewalls 25 of the skirt 24 needn't be very great to produce the desired curling effect in the fibers 17. For example, a skirt 24 having a vertical height of 1¼ inches was constructed with a 9/32 inch spacing between the two sidewalls 25 adjacent the blower outlet 22. The sidewalls 25 were flared or curved downwardly and outwardly until they reached a maximum spacing of only 14/32 of an inch. The curvature of the sidewalls 25 should be sufficient to prevent the fibers from moving along and striking the sidewalls 25. It was found that if fluid leaving the blower outlet 22 had a velocity on the order of 600–900 feet per second, this velocity could be decreased to on the order of 150–600 feet per second within the expansion zone between the skirt sidewalls 25. It also was determined that fibers attenuated at these rates were mostly set by the time they reached the bottom of the skirt, although some became set in the region immediately below the skirt. As the diameter of the fibers is increased, the fibers will travel a greater distance before they are set.

Turning now to FIGS. 3 and 4, a blower 28 is shown with a modified embodiment of a skirt 29. As in the previously described embodiment, the skirt 29 includes flanges 30 for attachment to the blower 28 and a pair of spaced downwardly and outwardly diverging sidewalls 31. The sidewalls 31 may be curved, as shown, or they may be straight. However, in this embodiment, the flanges 30 are attached to the blower 28 with spacers 32 positioned between the skirt flanges 30 and the blower 28 to define a narrow space 33. The space 33 may, for example, be on the order of ⅛ inch to ½ inch. In operation, the blower 28 directs high velocity jets of fluid such as steam or air into a vertical slot 34. The jets of fluid pass through a throat 35 into an expansion region between the sidewalls 31 of the skirt 29. The jets of fluid passing through the throat 35 induce an augmented ambient air flow through a slot inlet 36 and out the throat 35. The fluid passing through the throat 35, including the augmented air flowing through the slot inlet 36, further causes an additional augmented ambient air flow through the space 33 and into the expansion skirt 29. This induced air flow is believed to form a boundary layer along the sidewalls 31. It will, however, increase the turbulence in the fluid flowing from the throat 35. The air induced to flow through the narrow space 33 will tend to reduce some of the induced air flow through the blower slot inlet 36. As a consequence, there will be less cooling of the fibers as they are attenuated within the slot 34. This in turn results in the fibers remaining soft for a longer period of time, giving more curl to the fibers. This decrease in the cooling rate is of importance when the fibers are attenuated to small diameters which tend to cool and harden more rapidly than larger diameter fibers. An additional benefit and important feature of providing augmented air flow between the flanges 30 and the blower 28 is that the fibers passing through the skirt 29 and the sidewalls 31 are prevented from striking the skirt sidewalls 31. As a consequence, there is less fiber breakup. There is also a greatly reduced occurrence of glass and dirt buildup on the sidewalls 31 requiring less down time of the fiber forming apparatus for cleaning of the skirt 29.

One condition which may occur with the apparatus described in FIGS. 1–4 and may be a problem in severe cases is "necking in" or converging together of the fibers. As previously stated, the fibers are produced from one or two closely spaced rows of orificed tips on a feeder. The rows of fibers have a tendency to bunch together towards the center of the row in the region immediately below the skirt. This is believed to be a result of the following phenomenon: As the rectilinear fluid stream leaves the skirt 24, there is a free expansion to ambient pressure. Because of the rectilinear shape of the fluid stream, a two dimensional expanding flow exists at the center while a three dimensional expanding flow is present at the ends of the slot 34. As a result thereof, a transverse static pressure gradient causes a mass flow from the slot ends toward the center with an undesirable bunching of the entrained fibers. One solution to this problem is to grade the size of the fluid jets within the blowers to provide a greater mass flow rate adjacent the ends of the slot than at the middle. Still another solution to the problem is provided in the modified skirt 36 shown in FIGS. 5 and 6. As in the previous embodiments, the skirt 36 is provided with a pair of flanges 37 for mounting the skirt 36 below a blower and a pair of downwardly and outwardly flared sidewalls 38 for defining an expansion zone. Adjacent each end of the skirt 36, a flange 39 extends downwardly from each sidewall 38. The flanges 39 are tapered upwardly towards the center region of the sidewalls 38. The sidewalls 38 are closed by end walls 40 and together the end walls 40 and the flanges 39 function to delay the three dimensional expansion, allowing the two dimensional expanding flow at the center to level. By this technique, the transverse pressure gradient does not exist or may be reversed thus aiding separation of the entrained fibers.

Another means for preventing necking in is disclosed in Stalego U.S. Pat. No. 3,532,479 entitled Apparatus for Producing Glass Fibers. This patent discloses the use of a skirt having vertical sidewalls adjacent the center of a blower slot and increasingly diverging sidewalls adjacent the ends of the blower slot. Such an arrangement is shown in FIGS. 7 and 8 adapted to the present invention. Here, a skirt 41 is shown having upper flanges 42 for mounting the skirt 41 below a blower, sidewalls 43 and end walls 44. The sidewalls 43 and end walls 44 define a slot or opening 45 for alignment with a blower outlet. Adjacent the center of the slot 45, the sidewalls 43 flare outwardly and downwardly to the same degree as that of the skirts shown in FIGS. 1–6. However, adjacent the end walls 44 and the ends of the slot 45, the sidewalls 43 diverge more rapidly than at the center, controlling the expansion. Because of the increasing cross-sectional area from center to end, the center flow tends to choke, forcing a higher volumetric flow towards the slot ends. The resulting mass flow from the center of the slot to the ends prevents bunching of the entrained fibers.

Still a further modified embodiment of the skirt 46 is shown in cross section in FIG. 9. The skirt 46 includes at its upper edges flanges 47 for mounting below a blower adjacent an outlet for the attenuating fluid and the attenuated fibers. From the flanges 47, sidewalls 48 diverge downwardly and outwardly for providing an expansion region. Near the flange 47 on each sidewall 48, manifolding 49 is provided integral with the sidewall 48 to define a passageway 50. Each passageway 50 is connected through an orificed opening 51 in a sidewall 48 into the expansion region within the skirt 46. It will be appreciated by those familiar with fluidics that once the high velocity fluid flow leaving the blower and entering the expansion region within the skirt 46 is directed along one of the sidewalls 48, it will continue to flow along such sidewall. By providing compressed air pulses alternately to the passageways 50, the fibers may be made to alternately follow along the opposite sidewalls 48 of the skirt 46. Thus, the skirt 46 forms a pneumatic flip-flop and may be used for distributing the fibers on a collection surface, as well as for curling the fibers. If desired, the sidewalls 48 may be terminated at inwardly directed lower edges 52. The soft fibers moving along the sidewalls 48 impinge upon the inwardly directed edges 52 to increase the degree of curl as they set or harden. This is of particular value where the fibers have a relatively large diameter and, therefore, are difficult to curl. The lower edges 52 also increase the turbulence of the expanding fluid. The fluid turbulence may also be increased by forming either horizontal corrugations 53 or vertical corrugations (not shown) in the sidewalls 48. Establishing turbulence in the expanding fluid increases the curl formed in the fibers. Of course, it will be apparent that the corrugations may also be formed in the sidewalls of the various skirt embodiments shown in FIGS. 1–8.

Turning now to FIG. 10, a sectional view of a skirt 54 is shown attached adjacent an outlet 55 of a blower 56. A side elevational view of the skirt 54 and blower 56 will be identical to that of the skirt 29 and blower 28 shown in FIG. 3. Spacers 57 are positioned between the blower 56 and upper flanges 58 on the skirt 54 for defining air passages 59. The skirt 54 has two vertically oriented parallel sidewalls 60. The sidewalls 60 are horizontally spaced outwardly from the blower outlet 55 to cause a step increase in the width of the fluid flow path. The step is of a size sufficient to induce appreciable turbulence in fluid leaving the blower outlet 55 while such fluid is within the skirt 54. The fluid flow from the blower outlet 55 will also induce air to flow through the passages 59 into the region between the sidewalls 60. The induced air flow will tend to follow the sidewalls 60. At a low "pull" rate, or rate at which the fibers are attenuated, the fluid passing between the skirt sidewalls 60 will tend to be stratified and straight fibers will be produced. At higher pull rates, the induced air flow will increase and in turn result in turbulence in the region between the sidewalls 60 since the induced air flow will have a lower velocity than the fluid leaving the blower outlet 55. The turbulent flow within the skirt 54 may be made sufficient to impart a curl to the hardening fibers.

Turning now to FIG. 11, a cross section is shown of a still further modified embodiment of a skirt 61. The skirt 61 is mounted in alignment with and below an elongated outlet 62 from a fiber attenuating blower 63. The skirt 61 is shown as having three pairs of fins 64–66. Spacers 67 are provided for mounting the skirt 61 below the blower 63 to define elongated air passages 68 on each side of the blower outlet 62. The uppermost pair of fins 64 are mounted substantially parallel to the bottom of the blower 63 and on opposite sides of the blower outlet 62 to define the lower surface of the passages 68. Each of the fins 64 has a bend 69 adjacent an inner edge 70. The bend 69 and edge 70 on each fin 64 are directed parallel to the elongated blower outlet 62 with the bend directed to extend generally to the downstream direction of the fluid discharged from the blower outlet 62. Thus, the fluid discharged from the blower outlet 62 induces ambient air to flow through the passages 68 to form stratified layers contiguous to opposite sides of the discharged fluid. The second pair of fins 65 is mounted on opposite sides of the flow path of the fluid discharged from the blower outlet 62 and parallel to the first pair of fins 64 and includes a generally downwardly extending bend 71 parallel to the bends 69 in the first pair of fins 64. However, the second pair of fins 65 are spaced a further distance normal to the flow path of the fluid discharged from the blower outlet 62 than the first pair of fins 64. Ambient air is induced to pass through a passage 72 defined between the first fins 64 and the second fins 65 for forming a second stratified layer of air on each side of the fluid discharged from the blower outlet 62. The second layers are contiguous to and moving at a lower velocity than the first layers. Similary, the third pair of fins 66 are positioned below and parallel to the second pair of fins 65 and each includes a bend 73 spaced normal to and further from the flow path of the fluid discharged from the blower outlet 62 than the bends 70 on the fins 65. Thus, a passage 74 is defined between the fins 65 and 66 for providing a third stratified layer of ambient air on opposite sides of the flow path of fluid discharged from the blower outlet 62. The third layers are contiguous to and moving at a lower velocity than the second layers. The stratified layers of air flowing on opposite sides of the fluid discharged from the blower outlet 62 confine the fluid-fiber stream to provide a straight flow path with a minimal amount of turbulence until the fibers have set. The mass addition at the boundary layer on either side of the fluid discharged from the blower outlet 62 apparently prevents turbulence. The fibers produced with apparatus including the skirt 61 will be straight due possibly to the lack of expansion of the attenuated fluid and minimizing turbulence. Furthermore, the fibers will tend to cool and set very rapidly due to the cooling effect of the induced air flowing on either side of the attenuating fluid passing through the skirt 61. The skirt 61 also has the advantage of ease in alignment with the blower outlet 62 due to the increased visibility resulting from the fin spacing. The design of the skirt 61 also reduces dirt accumulation on the walls defined by the fins 64–66 and reduces fiber breakup since the fibers are confined to straight columns. Also, drag on the fibers as they pass through the skirt 61 is minimized since the velocity of the attenuating fluid is maintained through the skirt 61. Although the skirt 61 is shown with three pairs of fins 64–66, it will be appreciated that either additional or fewer fins may be used to obtain the desired results in the fibers produced with the blower 63 and skirt 61.

It will be appreciated that various modifications and changes may be made to the above-described apparatus for producing curly fibers from glass and similar thermoplastic fiber forming materials without departing from the spirit and the scope of the claimed invention.

What I claim is:

1. Apparatus for producing curly fibers from a thermoplastic fiber forming material comprising feeder means for holding a molten body of the material, said feeder means having a plurality of orifices formed therein for issuing at least one row of streams of molten material, blower means including a housing disposed beneath said feeder means having a pressure chamber formed therein and having an elongated walled vertical slot closed by end walls extending through the housing and defining inlet and outlet openings for receiving and discharging such streams of material, said housing having means formed along said slot for the issuance of jets of gaseous fluid from said pressure chamber into said slot, said last named means being so positioned with respect to said slot as to induce an augmented flow of air through said slot inlet by such fluid jets and discharged through said slot outlet with such fluid jets, such fluid jets and augmented air flow attenuating the streams of molten material into fibers, and gaseous fluid expansion means for appreciably decreasing the velocity of and imparting turbulence to gaseous fluid discharged from said slot outlet before the entrained fibers have set, said gaseous fluid expansion means comprising skirt means having two sidewalls curving downwardly and outwardly from adjacent elongated sides of said slot outlet to cause a decrease in the velocity of the attenuated fibers and the fluid discharged from said slot outlet and to impart turbulence to the gaseous fluid discharged from said slot outlet whereby the attenuated fibers take on a random curly configuration as such fibers harden, said skirt means being spaced below said blower means whereby ambient air is induced by the expanding fluid to flow through such spacing and along said skirt sidewalls, such induced ambient air flow preventing the attenuated fibers from striking said skirt sidewalls.

2. Apparatus for producing curly fibers, as set forth in claim 1, wherein said walls of said skirt means are spaced outwardly from said slot outlet sides whereby the discharged gaseous fluid from the slot outlet and into said skirt experiences a rapid step expansion.

3. Apparatus for producing curly fibers, as set forth in claim 1, wherein said skirt means includes pneumatic flip-flop means for causing the hardening attenuated fibers to alternately follow along said skirt sidewalls.

4. Apparatus for producing curly fibers, as set forth in claim 3, wherein said skirt means includes means for increasing the turbulence of the gaseous fluid discharged from said slot outlet as it expands in the region of said skirt means.

5. Apparatus for producing curly fibers, as set forth in claim 4, wherein said turbulence increasing means includes a plurality of corrugations in said walls of said skirt means.

6. Apparatus for producing curly fibers, as set forth in claim 4, wherein said turbulence increasing means includes an inwardly directed bend in each of said walls of said skirt means adjacent lowermost portions of said walls of said skirt means.

7. Apparatus for producing curly fibers, as set forth in claim 1, wherein said skirt means includes means for increasing the turbulence of the gaseous fluid discharged from said slot outlet as it expands in the region of said skirt means.

8. Apparatus for producing curly fibers, as set forth in claim 7, wherein said turbulence increasing means includes a plurality of corrugations in said sidewalls of said skirt means.

9. Apparatus for producing curly fibers, as set forth in claim 7, wherein said turbulence increasing means includes an inwardly directed bend in each of said sidewalls of said skirt means adjacent lowermost portions of said sidewalls of said skirt means.

10. Apparatus for producing curly fibers, as set forth in claim 1, wherein said skirt means includes means for preventing the row of attenuated fibers from converging together.

11. Apparatus for producing curly fibers from a thermoplastic fiber forming material comprising feeder means for holding a molten body of the material, said feeder means having a plurality of orifices formed therein for issuing at least one row of streams of molten material, blower means including a housing disposed beneath said feeder means having a pressure chamber formed therein and having an elongated walled vertical slot closed by end walls extending through the housing and defining inlet and outlet openings for receiving and discharging such streams of material, said housing having means formed along said slot for the issuance of jets of gaseous fluid from said pressure chamber into said slot, said last named means being so positioned with respect to said slot as to induce an augmented flow of air to be drawn through said slot inlet by such fluid jets and discharged through said slot outlet with such fluid jets, such fluid jets and augmented air flow attenuating the streams of molten material into fibers, skirt means for controlling fluid discharged from said slot outlet, and means spacing said skirt means below said blower housing, whereby the fluid discharged from said slot outlet causes air to flow through such spacing between said skirt means and said blower means and to flow along said skirt sidewalls to prevent the attenuated fibers from striking said skirt sidewalls, said skirt means including two vertical sidewalls parallel to and spaced outwardly from said slot outlet to permit a step expansion of and to impart a turbulence to the gaseous fluid discharged from said slot outlet, whereby a random curl is imparted to the attenuated fibers entrained in such discharged fluid before the fibers have set.

* * * * *